July 5, 1932. W. G. CUNNINGHAM 1,866,197
VEHICLE WASHING APPARATUS
Filed Sept. 30, 1929 2 Sheets-Sheet 1
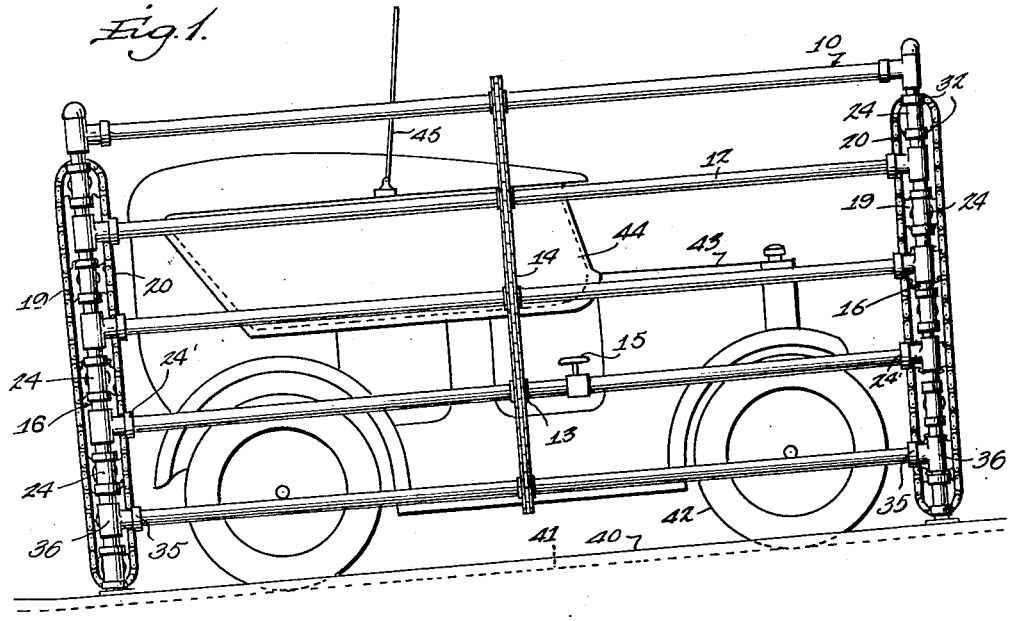
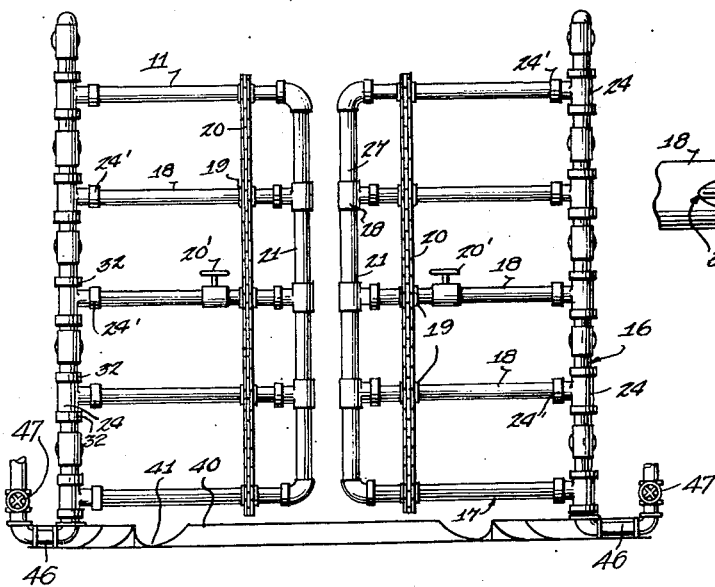
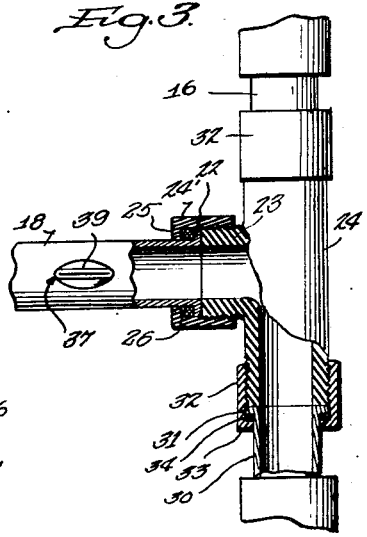
Inventor
W. G. Cunningham
Attorney July 5, 1932. W. G. CUNNINGHAM 1,866,197
VEHICLE WASHING APPARATUS
Filed Sept. 30, 1929   2 Sheets-Sheet 2
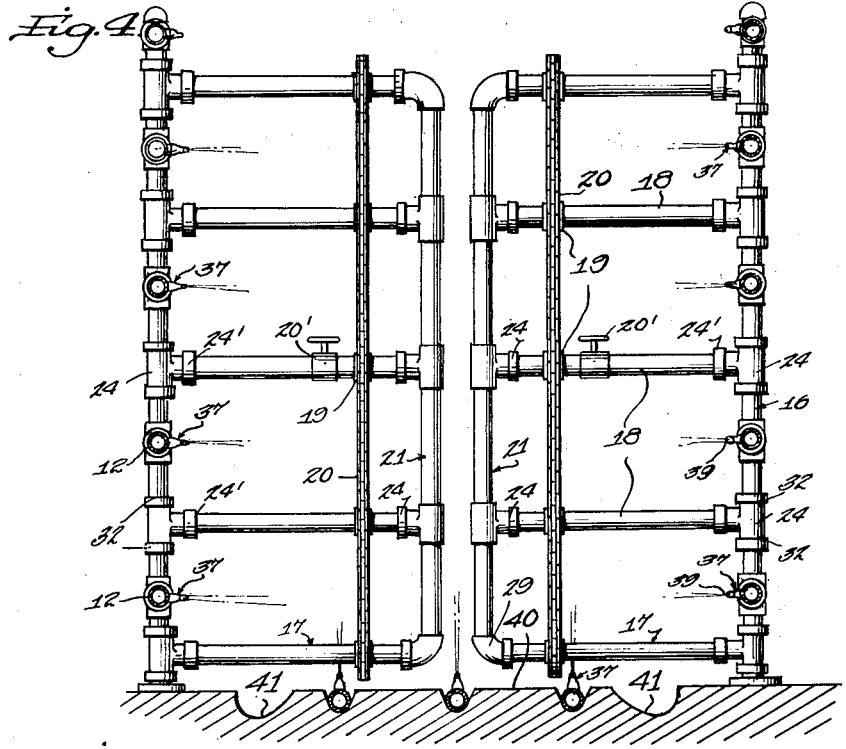
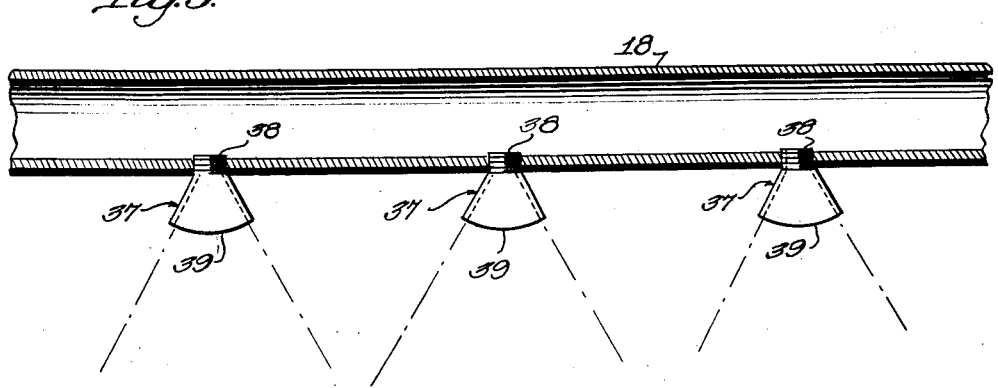
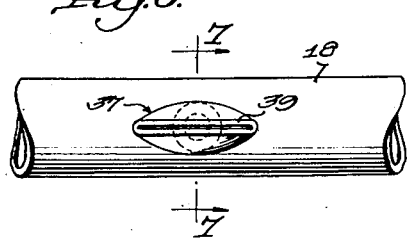
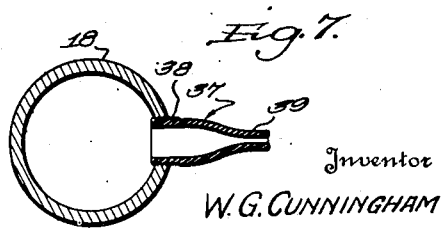
Inventor
W. G. CUNNINGHAM
By
Attorney Patented July 5, 1932

1,866,197

UNITED STATES PATENT OFFICE

WILLIAM G. CUNNINGHAM, OF ATLANTA, GEORGIA

VEHICLE WASHING APPARATUS

Application filed September 30, 1929. Serial No. 396,295.

This invention relates to vehicle washing apparatus.

An important object of the invention is to provide novel means for washing a vehicle without the necessity of employing a manually controlled hose.

A further object is to provide an apparatus which is adapted simultaneously to wash substantially all parts of the vehicle.

A further object is to provide a framework in which a vehicle is adapted to be arranged, the framework being formed of piping through which water is adapted to be fed and sprayed against the vehicle.

A further object is to provide an apparatus of the character just mentioned wherein the sides of the framework include parallel pipes having spray nozzles for directing streams of water against a vehicle, the parallel pipes being adapted for oscillation whereby all portions of the vehicle will be reached by the washing fluid and wherein the swinging of the pipes in one direction is adapted to flush downwardly the dirt and other foreign matter loosened from the surface of the vehicle.

A further object is to provide an apparatus of the above mentioned character wherein the ends of the framework are constructed in the form of gates which may be opened to permit the vehicle to enter and leave the framework.

A further object is to provide novel forms of spray nozzles whereby the nozzles of each oscillating pipe cooperate to project a flat sheet of water against the vehicle whereby a more efficient flushing action is obtained.

A further object is to provide novel means for simultaneously oscillating the pipes.

Other objects and advantages of the invention will become apparent during the course of the following description.

In the drawings I have shown one embodiment of the invention. In this showing,

Figure 1 is a side elevation,

Figure 2 is a front elevation showing the inlet end of the apparatus,

Figure 3 is a fragmentary elevation showing the means for connecting the end pipes to the corner posts, parts being shown in section, Figure 4 is a vertical transverse sectional view through the apparatus, Figure 5 is a detail sectional view of one of the spray pipes, the associated nozzles being shown in elevation, Figure 6 is a fragmentary face view of one of the spray pipes, and, Figure 7 is a section on line 7—7 of Figure 6.

The device forming the subject matter of the present invention comprises a frame including parallel side walls 10 and parallel end walls 11. Each of the side walls includes a plurality of parallel pipes 12 each of which is provided with a sprocket wheel 13 about which passes an endless chain 14. The pipes 12 are mounted for oscillation in a manner to be described, and any suitable means may be employed for effecting the oscillating action. For the sake of illustration one of the pipes 12 is shown as being provided with a handle 15 and it will be apparent that when this handle is swung back and forth the oscillating action of the corresponding pipe 12 will be transmitted to the remaining pipes through the chain 14 whereby all of these pipes will be simultaneously operated. The side and end walls are adapted to be supported by corner posts indicated as a whole by the numeral 16, to be later referred to in detail.

Each of the end walls 11 is formed of a pair of gates indicated as a whole by the numeral 17. Each gate comprises a plurality of preferably horizontal parallel pipes 18 each of which is provided with a sprocket wheel 19, and an endless chain 20 passes about the sprocket wheels of each set of pipes 18. One pipe 18 of each of the gates may be provided with a handle 20', similar to the handles 15 previously described. The outer ends of the pipes of the gates 17 are supported by the corner posts 16 previously described, while the inner ends of the pipes 18 are supported by inner vertical pipes indicated as a whole by the numeral 21.

The outer ends of the pipes 18 are provided with outstanding annular flanges 22 as shown in detail in Figure 3. These flanges are adapted to seat against the ends of lateral extensions 23 formed on T's 24 forming parts of the corner posts 16. A cap 24' is threaded on each extension 23 and is provided at its inner end with an internal annular flange 25. Suitable packing 26 is arranged between the flanges 22 and 25, and the structure just described constitutes a swivel connection between each pipe 18 and its corresponding corner post 16. The inner ends of the pipes 18 are provided with similar swivel connections which need not be referred to in detail, the vertical pipes 21 comprising a plurality of short pipe sections 27 connected at their ends to T's 28. It will be apparent that the swivel means for the uppermost and lowermost pipes 18 may be connected to the vertical pipes 21 by elbows 29.

The corner posts 16 include a plurality of short pipe sections 30, and the ends of these pipe sections which are connected to the T's 24 are provided with outstanding annular flanges 31 adapted to seat against the adjacent ends of the T's 24. Caps 32 are threaded on the ends of the T's and are provided at their ends with internal flanges 33. Suitable packing 34 is arranged between the flanges 31 and 33, as clearly shown in Figure 3. This structure provides a swivel connection between each T 24 and the remaining portions of its corresponding corner post 16, whereby it will be apparent that the gates are adapted to swing outwardly about the axes of the corner posts.

The ends of the pipes 12 of the sides of the frame also are connected to the corner posts by swivel connections 35 similar to those previously described. Each of the swivel connections 35 is associated with a T 36 in the upper and lower ends of which the short pipe sections 30 may be threaded.

Thus it will be apparent that the T's 36 and the short pipe sections 30 of the corner posts are stationary while the T's 24 are adapted to revolve.

Each of the parallel pipes of the side and end walls is provided with a plurality of spray nozzles 37 shown in detail in Figures 5, 6 and 7. Each spray nozzle is provided with a threaded inner end 38 adapted for connection with one of the spray pipes, the outer end of each nozzle being relatively flat and substantially fan shaped as indicated at 39. From the construction described, it will be apparent that each nozzle is adapted to project a spray of water which is relatively flat and is horizontally elongated, the sprays from the nozzles of each pipe being adapted to join to project a single elongated sheet of water for a purpose to be described.

The corner posts are adapted to be supported upon a suitable foundation 40 which is preferably inclined to permit the water from the spray pipes to drain toward one end of the apparatus. The foundation is preferably provided with trackways 41 to receive the wheels 42 of a motor vehicle 43. The apparatus is provided with a shield 44 adapted to surround the upper portion of the vehicle when an open car is to be washed, to prevent the water from being sprayed into the interior of the vehicle. Opposite sides of the shield 44 may be connected to depending supports 45, preferably in the form of ropes or flexible cables, and the upper ends of these elements may be suitably supported by means, (not shown) to permit the shield to be elevated and moved longitudinally. One of the corner posts at each side of the apparatus may be supplied with water through a suitable pipe 46 provided with a control valve 47. It will be apparent that each of the corner posts may be provided with the water supply means, if desired, but one of the pipes will suffice for each side of the apparatus since the various spray pipes thereof communicate with each other.

The operation of the apparatus is as follows:

The gates 17 at the inlet end of the apparatus are opened, and a vehicle is driven or pushed along the trackways 41 to a position within the apparatus. If the vehicle is an open one, the shields 44 are arranged in the position shown in Figure 1, but in the case of a closed vehicle, it merely will be necessary to close the windows thereof. The gates are then closed and the valves 47 opened to deliver water to the various spray pipes. While the water is being sprayed upon the vehicle the pipes may be oscillated by swinging the handles 15 and 20', or by employing any suitable mechanical means to accomplish this action. The oscillation of the pipes causes the streams of water to be moved upwardly and downwardly against the vehicle. As previously stated, a fan shaped spray is delivered from each nozzle 37 and the sprays from the nozzles of each pipe unite before they strike the vehicle to form a single flat sheet of water which is projected against the vehicle and is moved upwardly and downwardly by the oscillation of the pipes. The spraying of the water loosens the dirt and other foreign material from the vehicle and as the sprays are moved downwardly this foreign material will be flushed from the sides of the vehicle. The employment of flat sheets of water has been found to efficiently accomplish the flushing action. After the vehicle has been washed the gates at the outlet end of the apparatus may be opened to permit the vehicle to be removed from the apparatus.

The slope of the foundation causes the wash water to drain toward one end of the apparatus for collection in a suitable sewer. The gates and their associated T's 24 move as units and oscillate about the axes of the corner posts 16, while the swivel connections at the ends of the spray pipes permit all of these elements to be oscillated on their own axes. It has been found that the apparatus permits the vehicles to be quickly and efficiently washed without the use of a manually controlled hose, the washing action being hastened by the use of sprays for simultaneously washing all of the sides of the car while the efficiency of each side and end unit of the apparatus is increased by the use of the fan shaped spray nozzles.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. Apparatus of the character described comprising a substantially rectangular framework including a plurality of sides and corner posts, one of said sides constituting a gate swingably mounted on the adjacent corner post and adapted to be swung about the axis of said corner post to permit a vehicle to enter said framework, each side of said framework including a plurality of substantially horizontal pipes connected to said corner posts to oscillate about their axes, means for supplying water to said pipes, and spaced nozzles carried by each of said pipes and adapted to project water against the vehicle.

2. Apparatus of the character described comprising a substantially rectangular framework including a plurality of sides and corner posts, a set of T's carried by each corner post and forming a part thereof, pipes pivotally connected to said T's on opposite sides of said framework and adapted to oscillate about their axes, a second set of T's pivotally carried by each corner post and adapted to swing about the axis thereof, a set of pipes pivotally conected to each of the second sets of T's and adapted to oscillate about their axes, said sets of pipes constituting gates adapted to be opened to permit a vehicle to enter and leave the framework, means for supplying water to all of said pipes, and a plurality of spaced nozzles carried by each pipe and adapted to project water against the vehicle.

In testimony whereof I affix my signature.

WILLIAM G. CUNNINGHAM.